July 2, 1963 S. WEISER 3,095,982
COMPLIANT SUPPORT FOR MATERIAL HANDLING APPARATUS
Filed Nov. 30, 1959 4 Sheets-Sheet 1

INVENTOR
Sidney Weiser
BY
ATTORNEYS

July 2, 1963  S. WEISER  3,095,982
COMPLIANT SUPPORT FOR MATERIAL HANDLING APPARATUS
Filed Nov. 30, 1959  4 Sheets-Sheet 2
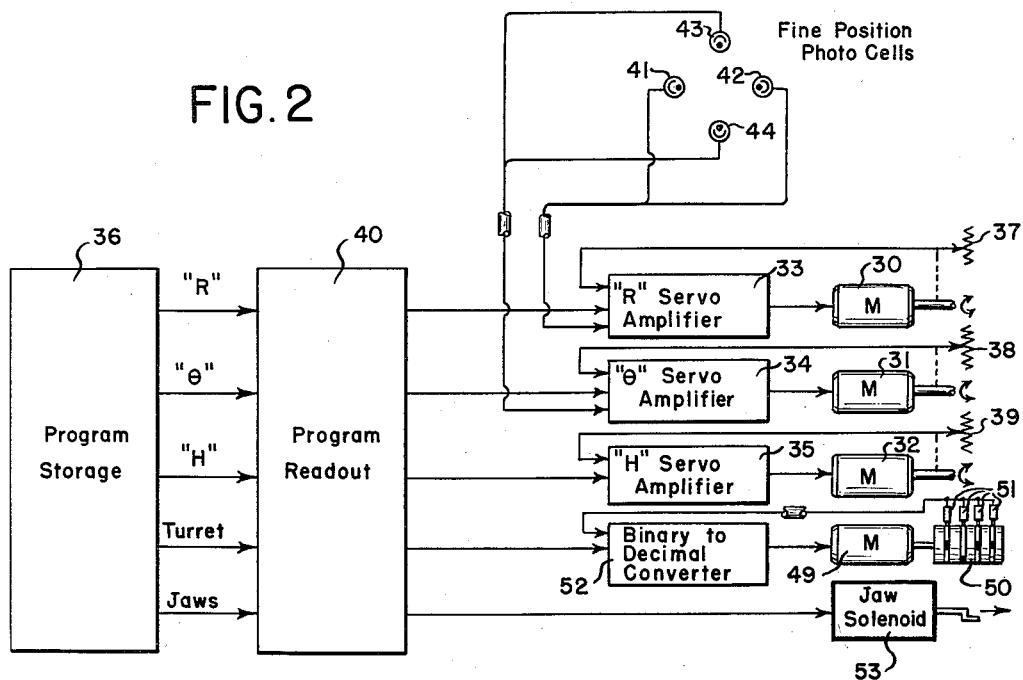
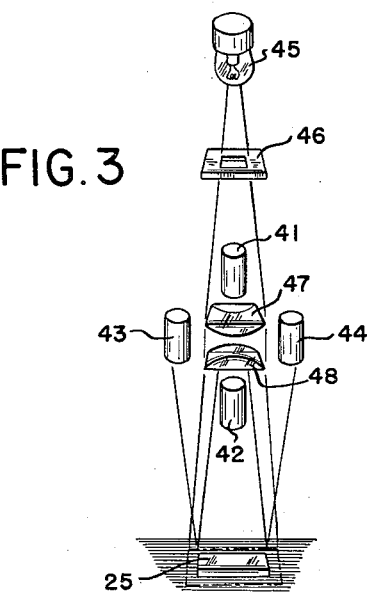
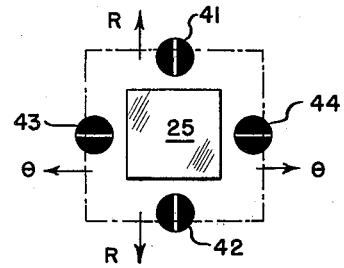
INVENTOR
Sidney Weiser
BY
Pennie, Edmonds, Morton, Barrows and Taylor
ATTORNEYS July 2, 1963   S. WEISER   3,095,982
COMPLIANT SUPPORT FOR MATERIAL HANDLING APPARATUS
Filed Nov. 30, 1959   4 Sheets-Sheet 3
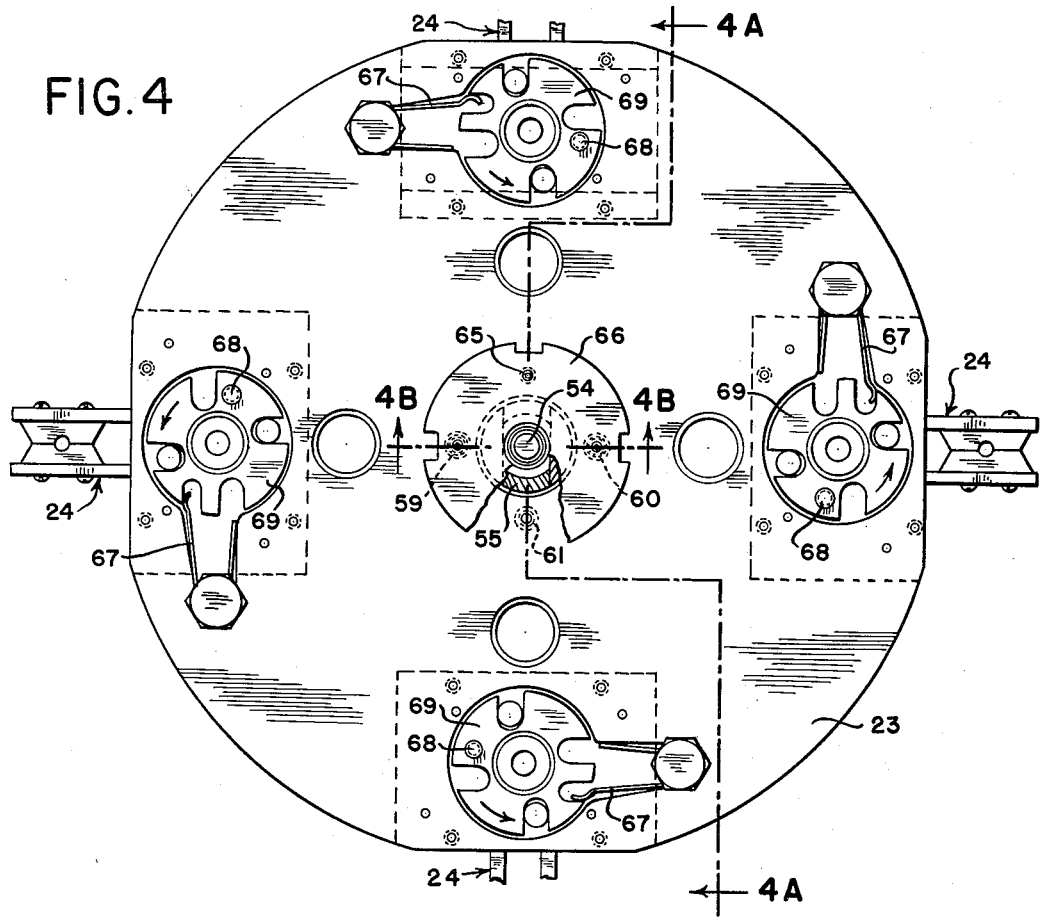
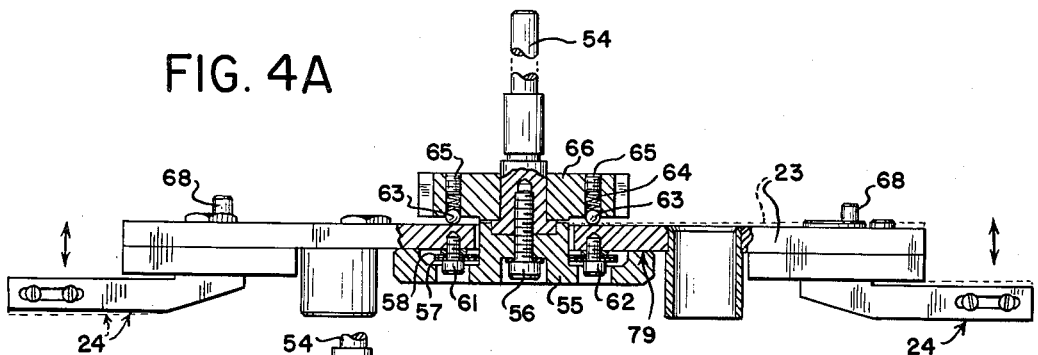
INVENTOR
Sidney Weiser
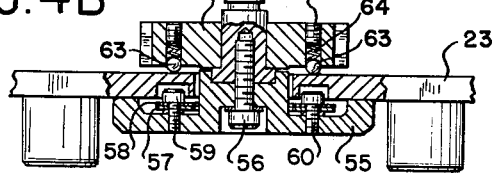
ATTORNEYS July 2, 1963 S. WEISER 3,095,982
COMPLIANT SUPPORT FOR MATERIAL HANDLING APPARATUS
Filed Nov. 30, 1959 4 Sheets-Sheet 4

INVENTOR
Sidney Weiser
BY
Rennie, Edmonds, Morton, Barrows and Taylor
ATTORNEYS

United States Patent Office 3,095,982
Patented July 2, 1963

3,095,982
COMPLIANT SUPPORT FOR MATERIAL
HANDLING APPARATUS
Sidney Weiser, Silver Spring, Md., assignor to U.S. Industries, Inc., New York, N.Y., a corporation of Delaware
Filed Nov. 30, 1959, Ser. No. 856,261
1 Claim. (Cl. 214—1)

This invention relates to electrically controlled apparatus which may be programmed to automatically and repetitively effect the pick-up transport and delivery of articles from one position or station to another, and more particularly to an improved compliant coupling support for a servo positioned handling means for grasping and releasing the articles.

The improved apparatus provided by the instant invention is particularly suitable for use in conjunction with the apparatus described in a co-pending application bearing the Serial No. 824,611, filed July 2, 1959, now Patent No. 3,007,097, entitled "Automatic Handling and Assembly Apparatus" and assigned to the assignee of this application. It should be noted, however, that the present invention is not limited in its use to employment in the said apparatus but rather may be used advantageously with any servo controlled material handling apparatus which ordinarily must be accurately positioned with reference to associated parts delivery machines or the parts themselves.

In all practical servo positioning mechanisms and the like which have been employed to control material handling mechanisms, there exists a well-defined limit or tolerance with regard to the positioning accuracy capability of the system. Generally speaking, the smaller the specified positioning accuracy tolerance for such a system, the more complex, critical and expensive are the control mechanisms therefore. In applications requiring the accurate positioning of small parts, it has generally been necessary to employ elaborate and expensive servosystems in order to meet the tolerance specification. In many instances the tolerance specification for the positioning system has been dictated by the fragile nature of the parts to be handled by the machine rather than by the dimensions of the parts. In other instances the tolerance specification has been dictated by the relatively fragile nature of the assembly apparatus, particularly where such apparatus has been employed to function with relatively rigid parts associated with or supplied by rigid co-operating machinery. In the latter instances it has often been necessary to employ expensive and complex servo-positioning systems to operate with small positioning error or tolerance in order to protect the assembly apparatus against destruction.

It is a principal object of this invention to provide an improved compliant support for material handling apparatus which will effectively enhance the positioning tolerance specification for relatively simple and inexpensive follow-up type servo-positioning systems employed therewith.

It is a further object of this invention to provide an improved support for material handling apparatus which can be adjusted to provide a limited and controllable amount of pressure between the handling apparatus and an article being positioned with respect to a rigid surface.

Generally speaking, this invention resides in the provision of an improved support for the jaws of material handling apparatus wherein a limited and controlled amount of compliance is provided to accommodate the servo positioning tolerance error in the direction of at least one system co-ordinate. The compliant support permits direct contact between the handling jaws of the assembly apparatus and a stationary part or machine and by permitting relative motion between these jaws and their supporting arm effectively provides the system with a sense of touch analogous to that of the human hand.

An important feature of this invention lies in the fact that the compliant support always assures that the follow-up type servo-positioning system will reach its normal null position after the work jaws have come in contact with associated fixed position apparatus. Where the compliant support of this invention is not employed, the servo system can either position the handling jaws to a null in the absence of contact with rigid surfaces (no resistance pressure), or the servo-system can produce contact pressure without ever reaching the desired null position. Both conditions, however, cannot be achieved simultaneously. The compliant support provided by this invention is particularly useful in conjunction with the material handling apparatus described in the above referenced co-pending application wherein servo null-detection apparatus is provided to determine the completion of a work assignment and to advance the readout system to the next stored work program. It should also be noted that this invention makes it possible to employ a critically damped servo-system having position overtravel without producing damage to the handled parts, handling apparatus or associated machines. The compliance limit distance (range of relative motion) is advantageously established to be greater than the total positioning tolerance of the servo-positioning system employed in the co-ordinate direction of interest, thereby assuring that the positioned article will always be properly placed at the work station or properly removed therefrom. The spring constant of the compliant member is advantageously selected or adjusted to produce a desired maximum pressure (within the limited range of relative motion) between the handling jaws and a part or a co-operating machine at a given work station.

The improved mounting support provided by the present invention affords an effective and inexpensive means for overcoming the otherwise intolerable positioning inaccuracies of simple inexpensive follow-up type servo-positioning systems employed in the control or drive systems for precision handling apparatus.

Other objects and various further features of novelty and invention will be pointed out in the drawings and the following specification.

In the drawings:

FIG. 2 is a simplified block diagram of the electrical positioning and control system for the automatic material handling machine shown in FIG. 1;

FIGS. 3 and 3A are fragmentary perspective views showing the general mechanical arrangement of a homing-type photo-sensitive fine positioning system incorporated in the apparatus shown in FIG. 1;

FIG. 4 is a plan view of an improved work turret which features a compliant support in accordance with the teachings of the invention;

FIGS. 4A and 4B are sectional views of FIG. 4 showing several structural details of the compliant support for the work jaws of the apparatus shown in FIG. 1.

Figure 1:
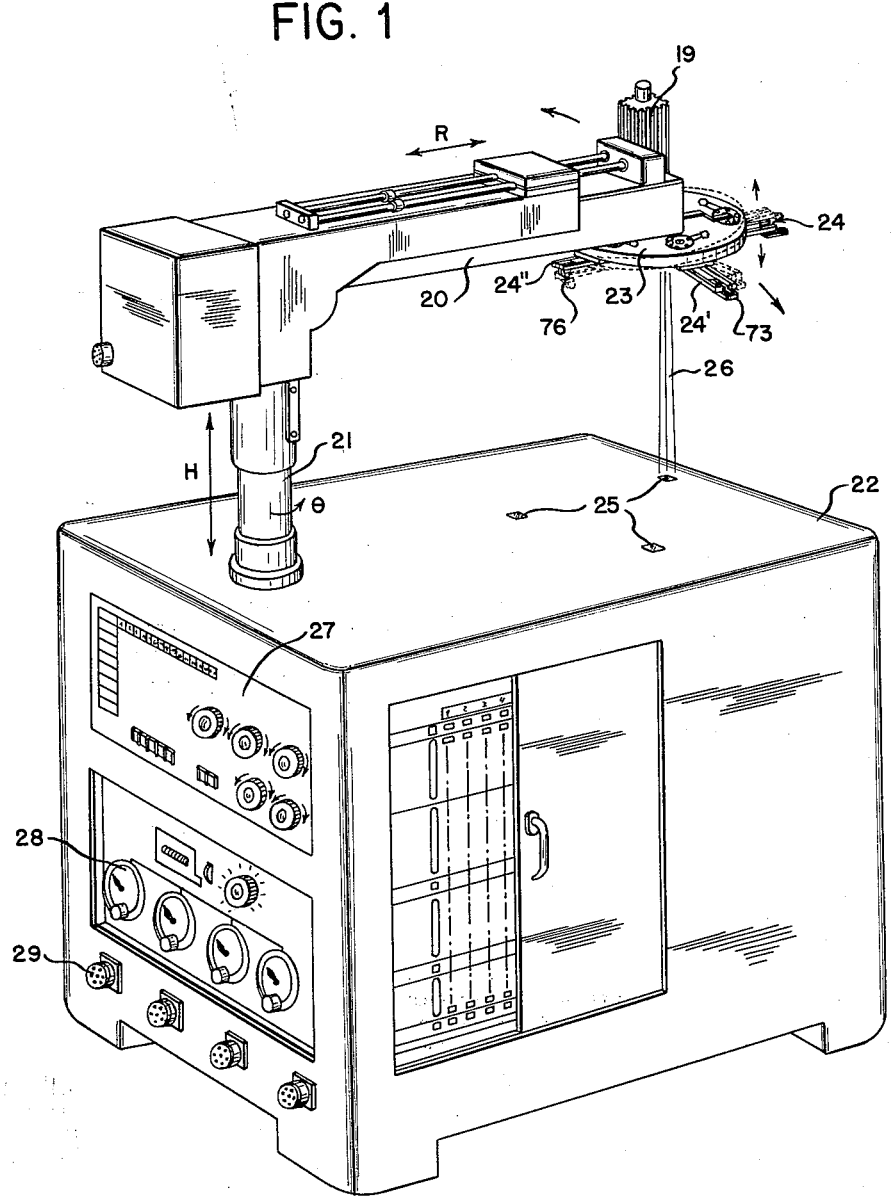
FIG. 1 is a perspective view of an automatic material handling machine embodying the features of the present invention.

Referring to FIG. 1 there is shown therein an electrically driven automatic handling and assembly machine of the programmed type. The improved apparatus provided by this invention is particularly suited for use with this machine and a preferred embodiment of the invention will be described in connection therewith. In the perspective drawing there is shown a mechanical arm 20 mounted on a rotatable supporting post 21. Work table 22 supports the mechanical arm and in addition houses the electrical servo-positioning systems, program storage system, and a program readout system. The mechanical arm is adapted to operate within a cylindrical co-ordinate system being adjustable in radial length R, in height H and azimuth angle $\theta$. Positioning of the arm within the cylindrical co-ordinate system is effected automatically by programmed electrical servo-motor systems.

A rotatable turret 23 is mounted at one end of the mechanical arm and a plurality of work jaws 24 are supported by the turret. In accordance with the teachings of this invention the turret work head is suspended from the arm by a compliant support which permits a limited amount of relative motion in the vertical direction (as shown) between the work jaws and the arm.

The work jaws are automatically opened by an electrical actuator on a programmed basis when the arm and preselected set of jaws is positioned above the work assignment. Selection of a particular set of work jaws is effected by an electrical shaft position control system. Although the turret head is shown as rotatable in the horizontal plane about a vertical axis normal to the supporting arm, clearly this turret could be oriented to operate equally well about any other axis. For example the turret could be mounted in the vertical plane and rotated about the longitudinal axis of the supporting arm. The compliant support in this instance would then permit relative motion between the jaws and the arm in the radial (R) direction of travel.

Potentiometers are employed in the electrical follow-up type servo-systems to provide coarse positioning of the arm in R, $\theta$ and H co-ordinates whereas electro-optical fine positioning information is provided for the R and $\theta$ co-ordinates by a special light source and mirror combination working in conjunction with a plurality of photo-cells. Small mirrors 25 are located on the work table at the desired work stations. These mirrors serve to reflect a portion of light beam 26 upwardly to the turret head where photo-cells detect the edges of the beam and accordingly develop fine-position signals for the respective electrical servo-positioning systems.

A program set-up panel 27 is provided as shown in FIG. 1. Controls for presetting the position-control potentiometers are mounted on this panel. These potentiometers are normally preset by a factory methods engineer and function as program storage devices for any desired combination of work positions in a given production assignment. Timer switches 28 and external connectors 29 are provided to permit transmission or reception of synchronizing control signals to or from co-operating external apparatus such as punch presses, welding machines, conveyor devices, etc.

In accordance with a principal feature of the invention work turret 23, providing a common support for jaws 24, is supported by arm 20 with a compliant member which permits a limited amount of relative vertical motion between the work jaws and the work arm whenever a set of jaws comes in contact with a rigid surface during vertical movement of the arm. In the preferred embodiment shown in the drawings the compliant turret support is adapted to permit relative motion (between jaws and arm) in the vertical direction only (H co-ordinate). It will be apparent to those skilled in the art that the user may re-orient the turret with respect to the supporting arm and thereby provide compliance in the $\theta$ or R direction of travel. The present invention is not limited to the concept of providing compliance to contact pressure in any one specific positioning direction but rather contemplates broadly the means for affording such compliance in one or more directions of travel.

A simplified block diagram of an electrical positioning control system for the automatic handling and assembly apparatus illustrated in FIG. 1 is shown in FIG. 2. Reversible servo-drive motors 30, 31 and 32 energized by servo amplifiers 33, 34 and 35 are provided to position the work head in the R, $\theta$ and H co-ordinates respectively in accordance with pre-positioned memory potentiometers which form a part of the program storage 36. Potentiometers 37, 38 and 39, mechanically coupled to the R, $\theta$ and H drive systems, provide coarse-position control information for the respective servo systems which is compared with the ordered position information represented by the preset program potentiometers switched into the respective servo amplifiers by program readout 40 which may advantageously be a multiple position stepper type switch. These follow-up type servo systems are adapted to coarsely position the work head in the R, $\theta$ and H co-ordinates within the accuracy tolerance which can be effectively achieved by such null-seeking servo systems. In a practical working machine employing such servo systems a positioning tolerance of $\pm 0.01$ inch has been reliably maintained on a repetitive basis. This positioning accuracy may be enhanced appreciably by the incorporation of an optical homing-type fine position servo-control system. In the drawing photo-cells 41, 42 and 43, 44 function as the sensing elements for such a system and provide fine position information for the R servo amplifier and the $\theta$ servo amplifier respectively. These cells sense the edges of a narrow angle light beam that is projected by light source 45 through aperture 46, condenser lenses 47, 48 and reflected to the cells by mirror 25 (see FIGS. 3 and 3A). The light projector system and photo-cell detectors are mounted at the end of the work arm above the work head turret in housing 19 (FIG. 1). The small mirrors 25 are located on the surface of the work table at any number of desired work stations included in a given work program which is stored in program system 36. The fine-position photo-cell homing system only becomes operative after the coarse positioning follow-up servo system has moved the work arm to a point where the photo-cells are illuminated by the projected light beam reflected from the small reflecting mirrors. Thereafter, the photo-cell signals control the servo-positioning systems and thereby function to establish new position nulls for the respective servo systems. The work head is thereby accurately positioned immediately above the small pre-located mirrors with an enhanced accuracy in the R and $\theta$ co-ordinates. In a practical operating machine employing such a fine-positioning system a positioning tolerance of $\pm 0.002$ inch has been reliably maintained on a repetitive basis in the R and $\theta$ co-ordinates.

Clearly the positioning accuracy of the H servo system could also be enhanced by the addition of an optical type fine positioning control system. The need for improved positioning accuracy in this co-ordinate however is avoided in accordance with the teachings of this invention by providing a compliant turret support which affords a limited amount of relative motion between the work jaws and the arm. Aside from the advantages that accrue to this invention by way of servo simplification and cost, certain improved performance characteristics are also provided as will be explained below in conjunction with FIGS. 4, 4A and 4B.

Reversible motor 49 is provided as shown in FIG. 2 to rotate the work head turret and thereby position a desired set of work jaws above an article to be picked up (or released) at a work station. A multiple track binary coded cylinder 50 and microswitch pickoffs 51 are employed to provide present position information for the turret servo-control system. The binary coded shaft position information is changed to equivalent decimal position information by converter 52. Converter 52 additionally compares present position information with ordered position information stored by preset multiple position switches in program storage 36 and energizes motor 49 until a null comparison is obtained. Various shaft positioning systems of this type have been proposed in the prior art; one, by way of example, is described in pending application Serial No. 824,724 filed July 2, 1959, now Patent No. 2,989,680, entitled "Direction Sensitive Binary Code Automatic Position Control System."

Program storage for the work jaws comprises a plurality of preset switches which are connected to energize solenoid 53 by the program readout system 40. When energized, solenoid 53 opens a selected set of spring loaded jaws in preparation for grasping an article. Reference should be made to the above mentioned co-pending patent application for examples of programmed electrical servo systems and mechanical drive systems that may be satisfactorily employed as generally indicated in FIG. 2.

A preferred embodiment of a work head turret having compliance in the central support is shown in FIGS. 4, 4A and 4B. Four sets of work jaws 24 are rigidly supported by a common turret 23 which is in turn supported from the work arm by a rotatable drive shaft 54. Drive shaft 54 is rigidly coupled to work arm 20 via appropriate bearings and gear coupling is provided between this shaft and turret drive motor 49. A supporting base plate 55 is rigidly coupled to shaft 54 with cap screw 56. A pair of compliant coupling rings 57, 58 are secured to base plate 55 with cap screws 59 and 60. These rings may be advantageously made from thin sheets of phosphor bronze and mounted as shown with grain orientation disposed at 90°. The compliant rings are secured to the turret plate as shown in sectional drawing 4A by cap screws 61, 62. Four spring loaded plunger elements comprising a ball element 63, a coil spring 64 and an adjustable retaining screw 65 are mounted at 90° intervals in collar 66 which is rigidly secured to shaft 54. The phosphor bronze washer elements acting co-operatively with the four spring loaded plunger elements afford a limited amount of compliance in the H co-ordinate to pressure exerted against any of the jaws in the H direction. Retaining screws 65 are normally adjusted to provide sufficient restoring force to hold turret plate 23 flatly in contact with the baseplate surface 79. The maximum motion permitted by the compliant support is limited by contact between the upper surface of turret plate 23 and the lower surface of collar 66. The stiffness of the compliant support can be controlled over a limited range by adjustment of the retaining screws 65 to increase the amount of compression in springs 64 beyond the minimum required for restoring the turret plate to a flat rest position on the base-plate surface.

Those skilled in the art will recognize that the compliant support provided in the preferred embodiment of the invention is substantially rigid in the θ and R co-ordinates. During the normal operation of the arm and work head, the compliant support will permit a limited amount of relative motion between the work jaws and the work arm when the jaws contact a rigid article before the H-servo positioning system has reached its null position. This relative motion in the H direction produces no change in the θ and R positioning accuracy. The minimum range of relative motion provided by the compliant support is advantageously designed to be greater than the known maximum positioning error for the associated H servo system. When this condition obtains, the automatically controlled machine can be set up or programmed so that a given article will always be placed in a desired work station or removed therefrom and the servo-drive system will always reach a desired null position. The stiffness of the compliant support is advantageously chosen to produce a force in the H direction (during the overtravel interval) which is sufficiently gentle to prevent damage to the most fragile articles to be handled. Aside from this protective feature afforded by the invention, the pressure produced during the relative motion interval is particularly useful in automatic assembly operations to assure that parts are firmly situated and properly seated while being held by the work jaws, for example during a riveting operation.

The amount of pressure applied by the closed work jaws on the gripped surfaces of an article is controlled primarily by the stiffness (spring constant) of springs 67 which normally maintain the jaws in a closed position as shown. The work jaws are opened by a radially outward thrust of a solenoid actuated pawl against pin 68 attached to pivot plate 69. The mechanical working details of such a pivot plate arrangement are shown and described in the above-mentioned co-pending application and as such do not form a part of this invention.

Figure 5:
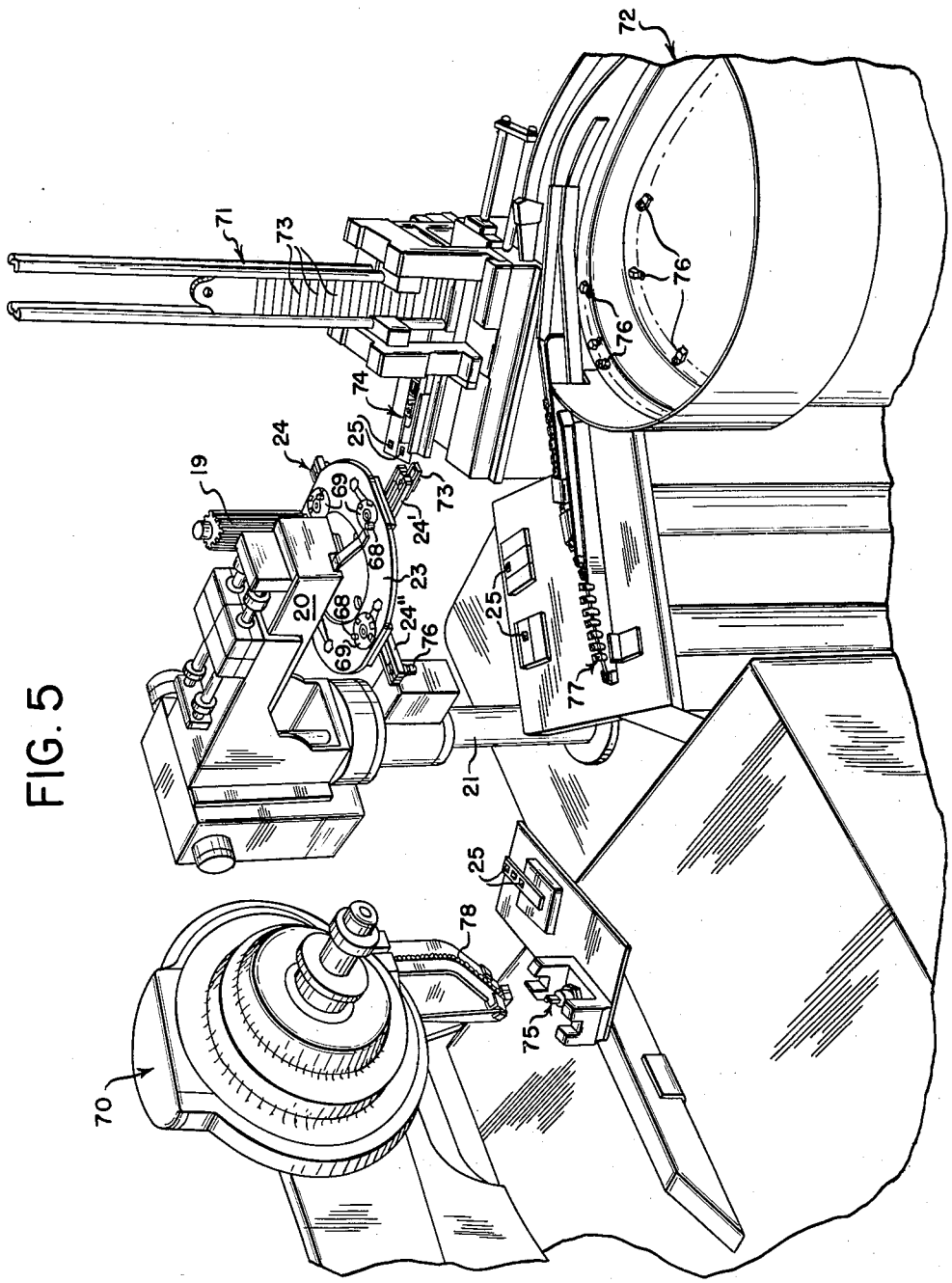
FIG. 5 is a perspective view showing the automatic machine of FIG. 1 mounted in working relationship with a plurality of co-operating machines and performing an automatic assembly operation.

In FIG. 5 the automatic assembly machine of FIG. 1, incorporating the features of this invention is shown performing the automatic assembly of fuse clips in co-operation with riveting machine 70, a magazine type feeder 71, and a vibrating hopper type feeder 72. Magazine feeder 71 is adapted to supply plastic fuse clip bases 73 properly oriented to a supply station 74 for removal by a preselected set of programmed work jaws 24. Jaw 24' is shown holding a plastic base while the arm is in transit to riveting anvil 75. Jaw 24" is shown holding a brass clip 76 which has been picked up from supply station 77. It should be noted that even though the supporting rails of both supply stations are rigid with respect to the arm of the assembly machine, the compliant support provided for the turret work head permits sufficient relative motion between the work jaws and the arm to prevent injury to the machines due to contact before the H servo system reaches its null. The range of relative motion is limited and is not intended to protect the machine or parts against gross errors in position programming. In accordance with the teachings of the invention the range of compliance in the H co-ordinate, by way of example, is sufficient to accommodate the maximum positioning error of a simple and inexpensive follow-up type servo-positioning system. In normal operation this means that the jaws may actually contact the rigid support rails of the feed stations prior to pick-up or release of an article without producing any malfunction. Furthermore, contact between an article held firmly in the jaws (e.g. plastic base) and a rigid work station before the "H" servo drive has reached a null does not result in crushing of the part or other malfunction. In fact the pressure produced against the part being positioned, due to the relative motion permitted by the compliant support in the H co-ordinate, may be employed advantageously in an assembly operation to assure firm positioning of a part during a particular operation. An example of such an instance arises in the riveting operation shown in FIG. 5. During the assembly operation the work jaws are required to mount a fuse clip on anvil 75 and then position the plastic base over the clip and hold it firmly in position while the riveting ram comes down to insert and spread a rivet 78.

The general importance to be attached to the contributions afforded by this invention is providing a relatively inexpensive programmable assembly machine that can reliably position and hold small parts with a controlled pressure will be appreciated by those skilled in the assembly automation field. It should be noted that the preferred embodiment of the automatic material handling apparatus described above operates in a manner analogous to that followed by a human being in positioning an article, the optical homing system being analogous to the sense of sight and the compliant support being analogous to the sense of touch.

It should be understood that it is not desired to limit this invention to the exact details of construction or to the precise mode of use of the apparatus herein shown and described, since various modifications within the scope of the appended claim may occur to persons skilled in the art.

I claim:

Automatic electrical servo position controlled apparatus adapted to pick-up, transport and deliver articles between a supply station and a receiving station comprising a support, a mechanical arm adjustably mounted on said support for movement in linear translation, in height and in azimuth rotation with respect to said support, a turret rotatably mounted on said arm adjacent a free end thereof, said turret having at least one set of grasping jaws mounted thereon, the fingers of said jaws being adapted to be opened and closed to grasp and release articles in accordance with a predetermined program, separate null-seeking servo motor control systems for positioning said arm support and turret in linear translation and azimuth rotation with respect to said support, a null-seeking servo motor control system for positioning said arm support and turret vertically within a predetermined height location of limited position tolerance with respect to said work station, means for supporting said turret from said arm, said means including a compliant ring member arranged to yieldably couple said turret to said arm and provide a limited range of relative motion between said turret and said arm in the vertical direction of travel while providing a stiff arm coupling support for said turret in the horizontal direction of travel, and means mounted on said turret for adjusting the effective stiffness of said compliant ring member to turret motion in the vertical direction.

References Cited in the file of this patent

UNITED STATES PATENTS

| | | |
|---|---|---|
| 1,987,336 | Powell | Jan. 8, 1935 |
| 2,187,879 | Johnson | Jan. 23, 1940 |
| 2,609,108 | Peterson et al. | Sept. 2, 1952 |
| 2,634,123 | Ralston | Apr. 7, 1953 |
| 2,858,597 | Kraemer | Nov. 4, 1958 |
| 2,931,276 | Zerlin | Apr. 5, 1960 |
| 3,007,097 | Shelley et al. | Oct. 31, 1961 |
| 3,056,317 | Huber | Oct. 2, 1962 |